(12) United States Patent
Deng

(10) Patent No.: US 7,986,693 B2
(45) Date of Patent: Jul. 26, 2011

(54) DATA LINK LAYER SWITCH WITH MULTICAST CAPABILITY

(75) Inventor: Shuang Deng, Nashua, NH (US)

(73) Assignee: Verizon Laboratories Inc., Waltham, MA (US)

( * ) Notice: Subject to any disclaimer, the term of this patent is extended or adjusted under 35 U.S.C. 154(b) by 62 days.

(21) Appl. No.: 12/535,027

(22) Filed: Aug. 4, 2009

(65) Prior Publication Data

US 2009/0290585 A1    Nov. 26, 2009

Related U.S. Application Data

(63) Continuation of application No. 11/153,823, filed on Jun. 15, 2005, now Pat. No. 7,573,874, which is a continuation of application No. 09/963,053, filed on Sep. 25, 2001, now Pat. No. 6,937,608, which is a continuation of application No. 09/291,705, filed on Apr. 14, 1999, now Pat. No. 6,317,434.

(51) Int. Cl.
*H04L 12/28* (2006.01)

(52) U.S. Cl. ........................................ 370/390; 370/401
(58) Field of Classification Search .................. None
See application file for complete search history.

(56) References Cited

U.S. PATENT DOCUMENTS

| 6,331,983 B1 * | 12/2001 | Haggerty et al. | 370/400 |
| 6,563,793 B1 * | 5/2003 | Golden et al. | 370/236 |
| 6,611,872 B1 * | 8/2003 | McCanne | 709/238 |

* cited by examiner

*Primary Examiner* — Phirin Sam

(57) ABSTRACT

A data link layer switch includes a switching mechanism coupled to a plurality of port interface controllers. Each of the port interface controllers comprises a multicast address table, a multicast matcher, and a timer. The multicast address table stores multicast addresses for hosts attached to the port interface controller. The multicast matcher matches an incoming packet to a target pattern, generates a multicast address from the incoming packet if the incoming packet matches the target pattern, and stores the generated multicast address in the multicast address table. The timer determines an amount of time that the generated multicast address remains in the multicast address table.

23 Claims, 5 Drawing Sheets

DATA LINK LAYER SWITCH WITH MULTICAST CAPABILITY

RELATED APPLICATIONS

This application is a continuation of U.S. patent application Ser. No. 11/153,823, filed Jun. 15, 2005, which is a continuation of U.S. patent application Ser. No. 09/963,053, filed Sep. 25, 2001, now U.S. Pat. No. 6,937,608, which is a continuation of U.S. patent application Ser. No. 09/291,705, filed Apr. 14, 1999, now U.S. Pat. No. 6,317,434, and is related to U.S. application Ser. No. 09/291,794, filed Apr. 14, 1999, now U.S. Pat. No. 6,208,647, which is assigned to the same assignee and filed on the same date as this application, the disclosures of which are all hereby incorporated herein by reference.

FIELD OF THE INVENTION

The present invention relates generally to network switches and more particularly to a data link layer switch that supports Internet Protocol (IP) multicasting.

BACKGROUND OF THE INVENTION

Multicast communication includes the transmission of identical data packets to selected, multiple destinations. In contrast, broadcast communication includes the indiscriminate transmission of data packets to all destinations, and unicast communication includes the transmission of data packets to a single destination.

Every participant in a multicast receives information transmitted by any other participant in the multicast. Users connected to the network who are not participants in a particular multicast do not receive the information transmitted by the participants of the multicast. In this way, the multicast communication uses only the network components (e.g., switches and trunks) actually needed for the multicast transmission.

With conventional techniques, a switch transmits multicast packets on all of its ports. FIG. 1 is a block diagram of an Ethernet switch 100. The Ethernet switch 100 includes a switching mechanism 110 connected to several port interface controllers 120. The switching mechanism 110 may include any conventional shared medium, shared memory, or space-division device.

The port interface controller 120 transports packets between a port and the switching mechanism 110. FIG. 2 is a block diagram of a conventional port interface controller 120. The port interface controller 120 includes an Ethernet interface 210, a Media Access Control (MAC) address learner 220, a MAC address table 230, a MAC address matcher 240, and a controller 250.

The Ethernet interface 210 receives an inbound packet transmitted from a host attached to the switch 100 over an Ethernet channel, and passes the packet to the MAC address learner 220. The MAC address learner 220 reads the Ethernet address of the originating host and stores the address in the MAC address table 230, if the address is not already stored there. The controller 250 maintains addresses of attached hosts in the MAC address table 230. If a host has not transmitted for a certain period of time, the controller 250 removes the MAC address of the host from the MAC address table 230.

The MAC address learner 220 sends the received packet to the controller 250, which, in turn, forwards the packet to the switching mechanism 110 (FIG. 1). The switching mechanism 110 identifies the appropriate port interface controller 120 for the packet and sends it to this controller.

The controller 250 of the identified port interface controller 120 receives the packet and sends it to the MAC address matcher 240. The MAC address matcher 240 compares the packet's destination address to the MAC addresses stored in the MAC address table 230. If the outbound packet's destination address is of a broadcast or multicast type, or is unicast and matches an entry in the MAC address table 230, the MAC address matcher 240 forwards the packet to its port for transmission to the attached host(s).

Conventional Ethernet switches do not support Internet Protocol (IP) multicasting. IP multicasting first found its application in audio and video conferencing. Each IP multicast group has a unique class-D IP address ranging from 224.0.0.1 to 239.255.255.255. Multicast data is sent to a group based on this unique address. For an IP multicast packet transmitted on the Ethernet, the multicast Ethernet address includes the least significant 23 bits of the IP address.

To join a particular IP multicast group, a host sends a "request to join" message to the nearest multicast-capable router to request receiving from the multicast group. The router propagates the request up to the multicast source if the data path is not already in place. Upon receiving an IP packet for this group, the router maps the class-D IP multicast group address into an Ethernet multicast address, and sends the resultant Ethernet group to the Ethernet port from which the original request was received.

The current Internet Group Management Protocol (IGMP) does not specify an explicit message for withdrawing membership from the multicast group. A host's membership expires when the router does not receive a periodic membership report from the host.

Some conventional Ethernet switches route IP packets and, therefore, support IP multicasting. However, despite the words "Ethernet switch" in their names, they are, in fact, not Ethernet switches, but routers because the actual switching is carried out at the IP or the network layer, not at the Ethernet or data link layer. Consequently, their performance and cost are comparable with routers and much higher than that of Ethernet switches due to the overhead of IP decoding and routing.

No multicast mechanism currently exists at the data link layer, corresponding to the IP layer. As a result, a conventional Ethernet switch sends multicast packets to all ports regardless of whether the hosts attached to these ports need them. It is the responsibility of the receiving host to determine whether a packet belongs to the groups that have been requested at the IP layer. The receiving host makes this determination through the use of an address filter either implemented in hardware on a Local Area Network (LAN) controller or in communication control software.

Thus, the current technologies for switching multicast packets at the data link layer are inefficient and will render the network inoperable when several hosts receive different multicast streams concurrently. To illustrate this problem, suppose that a conventional Ethernet switch includes one network port connecting a multicast router at 100 Mb/s and 24 local ports each connecting to a personal computer (PC) at 10 Mb/s. Assume that each of the PCs is tuned to a different video channel via IP multicasting, and each video stream is coded at 1.5 Mb/s. Since the Ethernet switch sends each multicast packet to all ports, the switch incurs a load of 24×1.5=36 Mb/s at each local port, far exceeding the PCs' 10 Mb/s capacity. As a result, the network becomes bogged down by congestion.

Therefore, a need exists to overcome the deficiencies of the conventional data link layer switches.

SUMMARY OF THE INVENTION

Systems and methods consistent with the principles of the present invention address this need by providing true multicasting at an Ethernet switch by sending packets to only those ports having attached hosts that have previously joined the multicast group. In this way, the need for expensive IP decoding and routing is eliminated.

In accordance with the purpose of the invention as embodied and broadly described herein, a system consistent with the present invention includes a switching mechanism coupled to a plurality of port interface controllers. Each of the port interface controllers comprises a multicast address table, a multicast matcher, and a timer. The multicast address table stores multicast addresses for hosts attached to the port interface controller. The multicast matcher matches an incoming packet to a target pattern, generates a multicast address from the incoming packet if the incoming packet matches the target pattern, and stores the generated multicast address in the multicast address table. The timer determines an amount of time that the generated multicast address remains in the multicast address table.

BRIEF DESCRIPTION OF THE DRAWINGS

The accompanying drawings, which are incorporated in and constitute a part of this specification, illustrate an embodiment of the invention and, together with the description, explain the principles of the invention. In the drawings.

DETAILED DESCRIPTION OF THE PREFERRED EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention support true multicasting in a data link layer switch, such as an Ethernet switch, by transmitting packets on only those ports with hosts that have previously joined the multicast group. This Ethernet switch multicasting reduces network traffic load and allows the Ethernet switch to be used for a large number of multicast streams. In particular, this switch can be used to provide near video-on-demand and broadcast video services.

Figure 1:
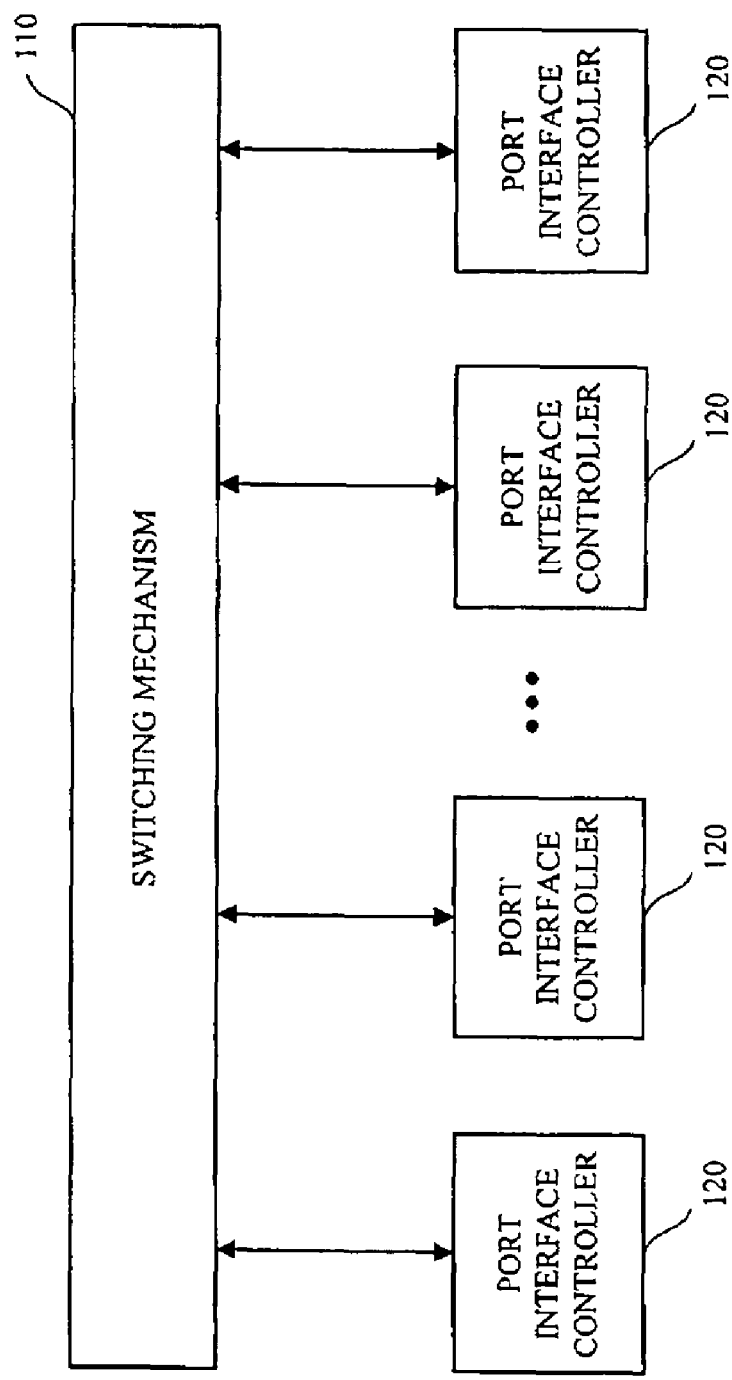
FIG. 1 is a block diagram of an Ethernet switch.
Figure 2:
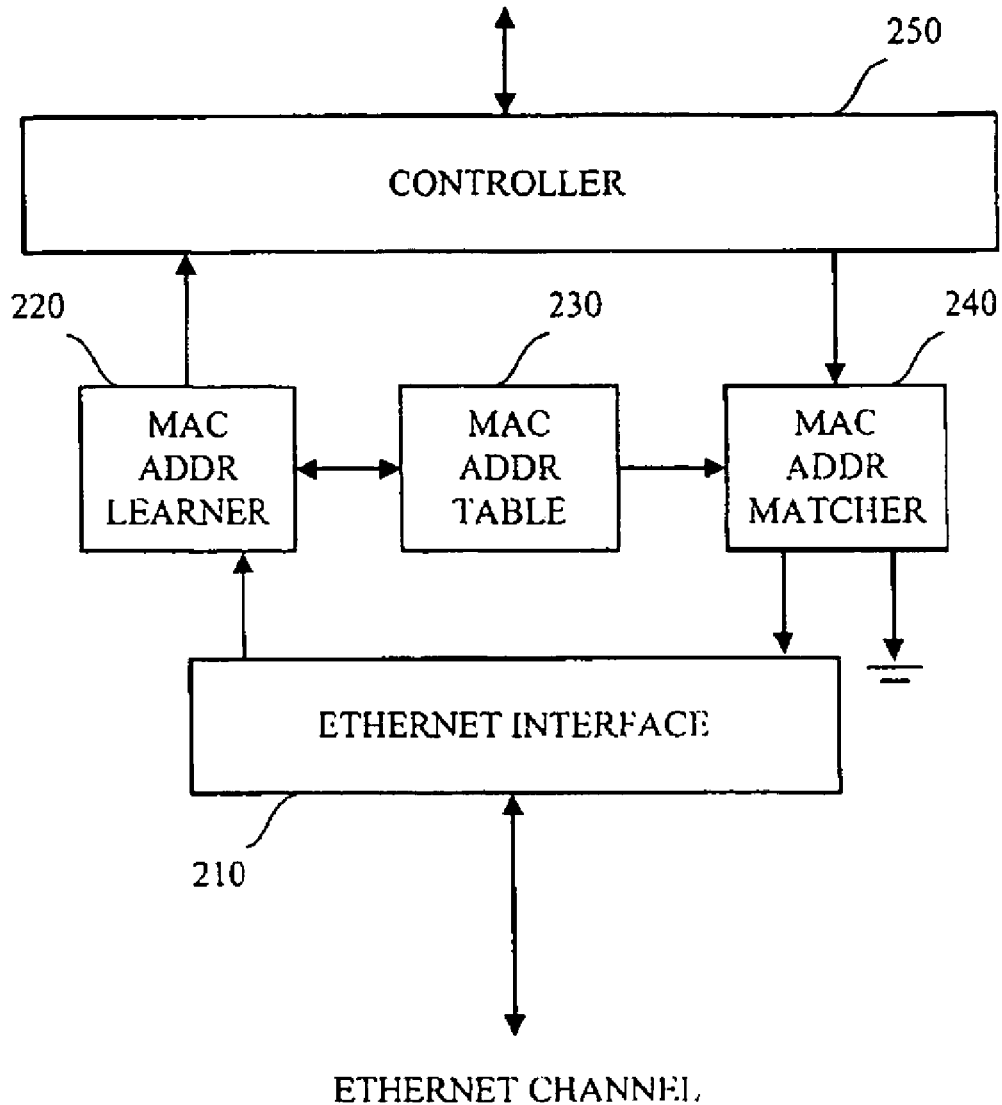
FIG. 2 is a block diagram of a port interface controller in the switch of FIG. 1.

Referring to FIG. 1, an Ethernet switch consistent with the present invention contains a standard configuration. That is, the Ethernet switch includes a switching mechanism 110 coupled to several port interface controllers 120. The elements comprising the port interface controllers 120 differ, however, from those elements shown in FIG. 2.

Figure 3:
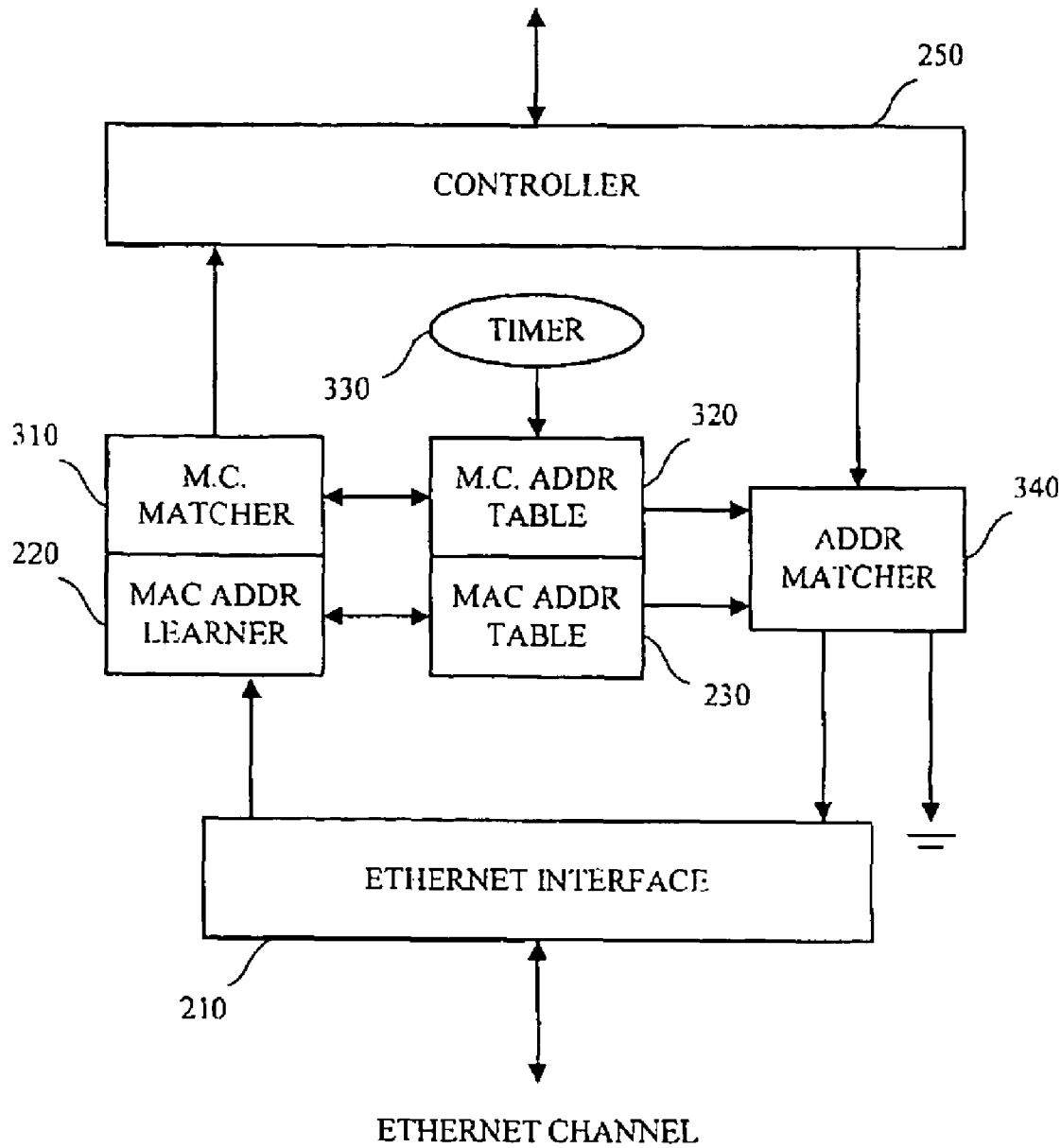
FIG. 3 is an Ethernet switch consistent with the present invention.

FIG. 3 is a diagram of a port interface controller 300 consistent with the present invention. The port interface controller 300 includes some of the same elements included in the conventional port interface controller 120 shown in FIG. 2. These elements contain the same reference numerals.

The port interface controller 300 includes an Ethernet interface 210, a MAC address learner 220, a MAC address table 230, a controller 250, a multicast request matcher 310, a multicast Ethernet address table 320, a timer 330, and an address matcher 340.

The multicast request matcher 310 includes a standard bit-pattern matcher of fixed length whose target pattern is updatable through a software download to support a variety of protocols and different versions. For the current version of IP and Ethernet protocols, the target pattern operates on the 13th, 25th, and 35th bytes of the Ethernet packet (i.e., the protocol-type field of the Ethernet and IP headers, and the version and type fields of the IGMP header). The matcher 310 finds a match, for example, if the protocol fields are IP and IGMP, and the byte for version and type is 0x21.

The multicast address table 320 contains a list of Ethernet multicast addresses of hosts attached to the Ethernet channel. The table is similar in construction and format to the MAC address table 230. The timer 330 is a counting mechanism implemented in hardware, using a conventional counter, or software, using a conventional counting algorithm. The address matcher 340 includes a mechanism for comparing a destination address to the addresses stored in the MAC address table 230 and the multicast address table 320.

Figure 4:
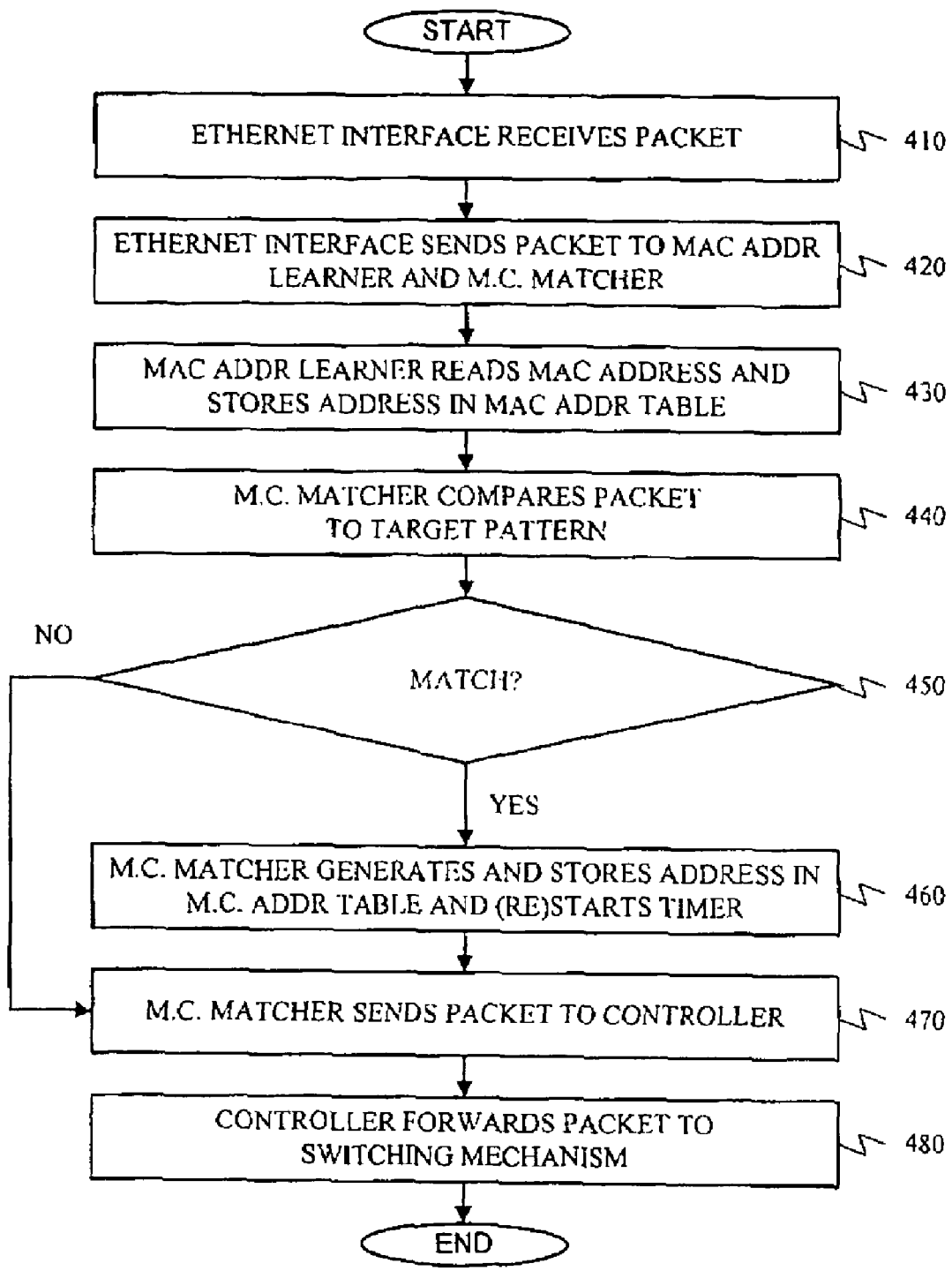
FIG. 4 is a flowchart of multicast processing of an incoming packet performed by the port interface controller 300 of FIG. 3.

FIG. 4 is a flowchart of multicast processing of an incoming packet performed by the port interface controller 300 of FIG. 3. The Ethernet interface 210 receives an incoming packet from a host attached to an Ethernet channel [step 410]. The interface 210 sends the packet to the MAC address learner 220 and the multicast request matcher 310 [step 420].

The MAC address learner 220 reads the Ethernet address of the originating host and stores the address in the MAC address table 230, if the address is not already stored there [step 430]. The controller 250 maintains addresses of attached hosts in the MAC address table 230. If a host has not transmitted for a certain period of time, the controller 250 removes the MAC address of the host from the MAC address table 230.

The multi cast request matcher 310 determines whether the packet matches a target pattern [step 440]. For example, the matcher 310 may compare the packet to a target pattern that operates on the 13th, 25th, and 35th bytes of the packet. If the packet matches the target pattern [step 450], the matcher 310 performs no decoding, but simply extracts the 37th through 39th bytes of the packet and sets the highest bit to zero. The matcher 310 then appends these bytes to an Ethernet multicast address header, such as the Ethernet multicast header 0x01005e000, and stores the newly formed Ethernet multicast address in the multicast address table 320 [step 460]. The Ethernet multicast address is derived according to an IP to Ethernet address mapping method defined in IETF RFC-1112, which is hereby incorporated by reference.

The multicast matcher 310 stores the multicast address in the multicast address table 320 only if the packet is a request to join a multicast group. If the packet is, instead, a request to leave a multicast group, the multicast matcher 310 removes the multicast address from the multicast address table 320.

In addition to storing the multicast address, the matcher 310 starts or restarts the timer 330. The timer 310 is used to determine the length of time that an address remains in the multicast address table 320. An address is removed from the table upon the expiration of the timer.

If the packet does not match the target pattern [step 450] or does match and the multicast address has already been stored in the multicast address table 320 [step 460], the multicast address matcher 310 sends the packet to the controller 250 [step 470]. The controller 250 forwards the packet to the switching mechanism [step 480], ending the processing of the incoming packet by the port interface controller 300.

Figure 5:
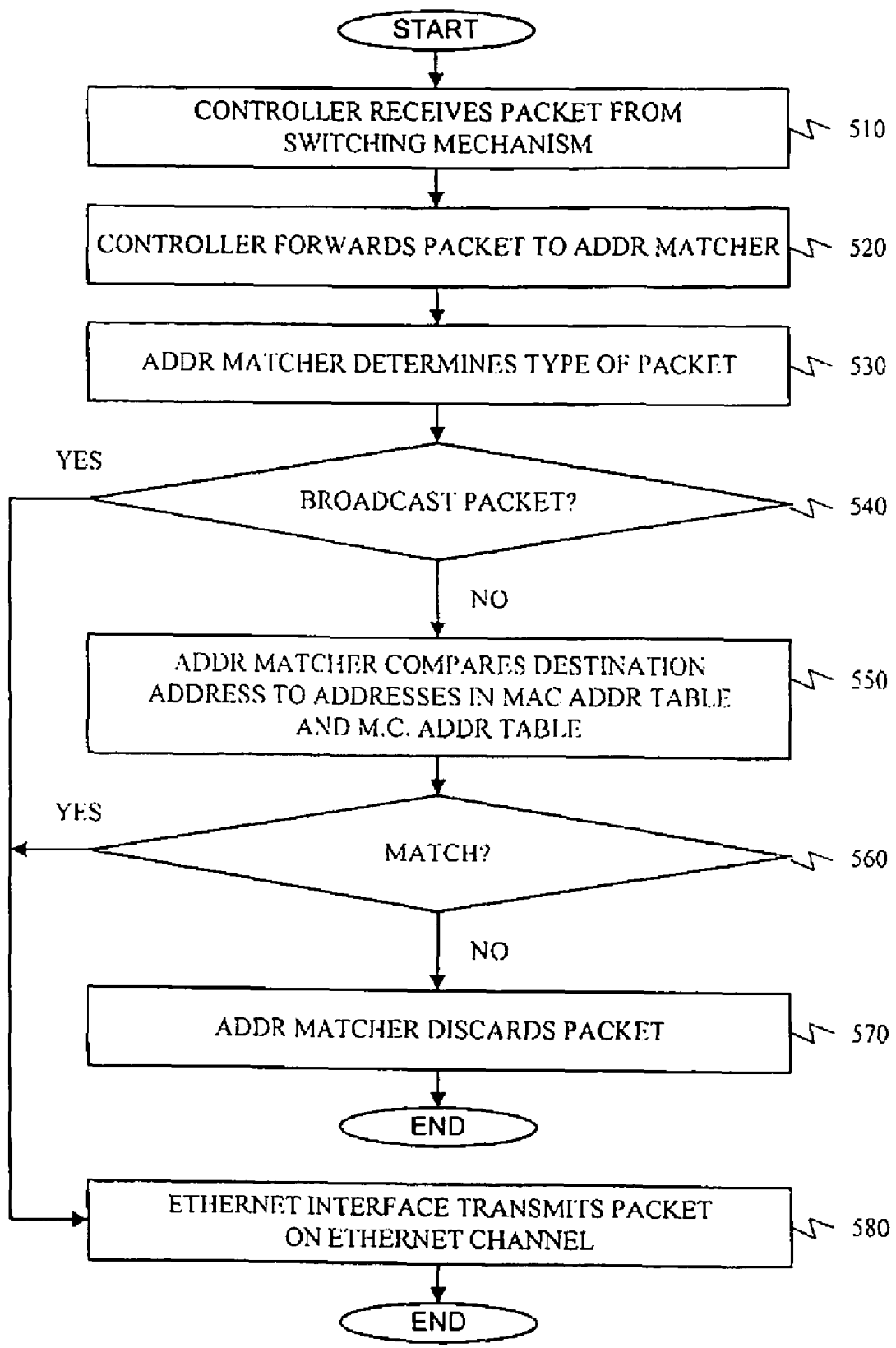
FIG. 5 is a flowchart of multicast processing of an outgoing packet performed by the port interface controller 300 of FIG. 3.

FIG. 5 is a flowchart of multicast processing of an outgoing packet performed by the port interface controller 300 of FIG. 3. The controller 250 receives an outgoing packet from the switching mechanism [step 510]. The controller 250 forwards the packet to the address matcher 340 [step 520].

The address matcher 340 determines whether the packet is of a unicast, multicast, or broadcast type [step 530]. If the packet is not a broadcast packet [step 540], the address matcher 340 compares the destination address to the addresses stored in the MAC address table 230 and the multicast address table 320 [step 550]. If the destination does not match an address in either of the tables [step 560], the address matcher 340 discards the packet [step 570].

If the packet is a broadcast packet [step 540] or is a unicast or multicast packet and the destination address matches an address in either the MAC address table 230 or the multicast address table 320 [step 560], the address matcher 340 transmits the packet on the Ethernet channel via the Ethernet interface 210 [step 580]. The transmission ends the processing of the outgoing packet by the port interface controller 300.

The systems and methods consistent with the present invention support multicasting in a data link layer switch by sending packets to only those ports having an attached host that has joined the multicast group.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, the foregoing description was directed toward multicasting in an Ethernet switch. However, the present invention is not limited to an Ethernet switch. The foregoing description applies equally well to other data link layer switching mechanisms.

What is claimed is:

1. A network comprising:
a plurality of port interface controllers operatively interconnected by a switching mechanism;
each of said port interface controllers including:
an Ethernet interface for receiving an inbound packet from a host having a data link layer host address; and
a plurality of controller elements including:
a first of said elements receiving said packet from said interface and comparing said address with other data link layer host addresses stored in another of said controller elements and
a second of said elements comparing said packet to a target pattern and thereafter forwarding said packet to a switching mechanism interfacing controller which, in turn, forwards said packet to said switching mechanism; and
said switching mechanism transmitting said packet to another one of said port interface controllers receiving said packet from said switching mechanism in a controller element of said another one of said port interface controllers corresponding to said switching mechanism interfacing controller and, after processing in yet another of said controller elements, if said packet is not discarded by said yet another controller element, forwarding said packet as an outgoing packet to either:
a unicast link layer destination address of another host, or
a multicast link layer destination address of a plurality of hosts other than said host; or
un-determined hosts, excluding said host, if said outgoing packet is a broadcast packet.

2. The network of claim 1 wherein said first controller element is a media access control (MAC) address learner.

3. The network of claim 1 wherein said second controller element is a multicast request matcher.

4. The network of claim 1 wherein said another of said controller elements is at least a MAC address table.

5. The network of claim 4 wherein said plurality of controller elements further comprises a multicast address table and wherein said yet another of said controller elements is an address matcher which determines, provided that said outgoing packet includes either said unicast link layer destination address or said multicast link layer destination address, a match between either said destination address and any address stored in said MAC address table or in said multicast address table and discards said outgoing packet if there is no match.

6. The network of claim 5 wherein, if there is a match, said address matcher determines if said outgoing packet includes said unicast link layer destination address or said multicast link layer destination address.

7. An Ethernet switch comprising:
a plurality of port interface controllers;
a switching mechanism operatively interconnecting said plurality of port interface controllers;
each of said port interface controllers including:
an Ethernet interface for receiving an inbound packet from a host having a data link layer host address; and
a plurality of controller elements including:
a first of said elements receiving said packet from said interface and comparing said address with other data link layer host addresses stored in another of said controller elements and
a second of said elements comparing said packet to a target pattern and thereafter forwarding said packet to a switching mechanism interfacing controller which, in turn, forwards said packet to said switching mechanism; and
said switching mechanism transmitting said packet to another one of said port interface controllers receiving said packet from said switching mechanism in a controller element of said another one of said port interface controllers corresponding to said switching mechanism interfacing controller and, after processing in yet another of said controller elements, if said packet is not discarded by said yet another controller element, forwarding said packet as an outgoing packet.

8. The Ethernet switch of claim 7 wherein said outgoing packet is forwarded to either:
a unicast link layer destination address of another host, or
a multicast link layer destination address of a plurality of hosts other than said host; or
un-determined hosts, other than said host, if said outgoing packet is a broadcast packet.

9. A port interface controller comprising:
an Ethernet interface for receiving inbound and sending outgoing data link layer packets;

a switching mechanism interfacing controller for interfacing with a switching mechanism which interconnects a plurality of port interface controllers; and a plurality of port interface controller elements operatively coupled to each other and operatively coupled between said Ethernet interface and said switching mechanism interfacing controller, said plurality of port interface controller elements including a media access control (MAC) inbound packet address learner, a MAC address table, a multicast (MC) request matcher, an MC address table, a timer and an outgoing packet address matcher.

10. The port interface controller of claim 9 wherein:

said Ethernet interface sends said inbound packet to said MAC address learner and said MC request matcher;

said MAC address learner reads a host address from which said inbound packet was received and stores said address in MAC address table if not currently stored; and said MC request matcher determines whether said inbound packet matches a target pattern and, if so and only if said inbound packet is a request to join a multicast group, forms a new Ethernet MC address, stores said MC address in said MC address table and starts or restarts said timer which determines length of time that said new Ethernet MC address remains in said MC address table.

11. The port interface controller of claim 9 wherein:

said outgoing packet address matcher receives from said switching mechanism interfacing controller an inbound packet sent from another port interface controller via said switching mechanism and determines whether said inbound packet is of a unicast, multicast or broadcast type and, if not said broadcast type, said outgoing packet address matcher compares a destination address of said inbound packet to addresses stored in said MAC address table or said MC address table, discards said inbound packet if said destination address does not match any of said addresses stored in either table, but transmits said inbound packet as an outgoing packet from said Ethernet interface if said destination address of said inbound packet does match an address stored in either table.

12. A device, comprising:

a data link layer switching mechanism;

a plurality of ports; and a plurality of port interface controllers, each of the plurality of port interface controllers coupled to the data link layer switching mechanism and one of the plurality of ports, wherein at least a first one of the plurality of port interface controllers is configured to:

receive an outgoing multicast packet from the data link layer switching mechanism, access as first address table, determine, based on information in the first address table, whether a destination of the multicast packet is associated with a host device that has joined a multicast group, transmit, when the host device has joined the multicast group, the multicast packet to the host device via one of the plurality of ports coupled to the host device, and discard the multicast packet when the host device has not joined the multicast group.

13. The device of claim 12, wherein the multicast packet comprises an Ethernet packet and the device comprises an Ethernet switch.

14. A method, comprising:

determining if a host device has joined a multicast group;

receiving an outgoing multicast packet from a data link layer switching mechanism;

determining, whether a destination of the multicast packet is associated with a host device that has joined the multicast group;

transmitting, when the host device has joined the multicast group, the multicast packet to the host device, storing, when it is determined that the host device has joined the multicast group, an address associated with the host device in an address table, determining whether the host device has transmitted data within a period of time, and removing the address associated with the host device from the address table when the host device has not transmitted data within the period of time.

15. The method of claim 14, wherein the determining if a host device has joined a multicast group comprises:

determining whether the host device has transmitted a request to join the multicast group.

16. A device, comprising:

a data link layer switching mechanism; and at least one controller coupled to the data link layer switching mechanism and to an output port, wherein the at least one controller is configured to:

receive a multicast packet from the data link layer switching mechanism, determine whether a destination of the multicast packet is associated with a host device that is included in a multicast group, and transmit, when the host device is included in the multicast group, the multicast packet to the host device via an output port coupled to the host device, and discard the multicast packet when the host device in not included in the multicast group.

17. The device of claim 16, wherein the at least one controller comprises a plurality of port interface controllers.

18. The device of claim 16, wherein multicast packet comprises an Ethernet packet and the device comprises an Ethernet switch.

19. A device, comprising:

a data link layer switching mechanism;

a plurality of ports; and a plurality of port interface controllers, each of the plurality of port interface controllers coupled to the data link layer switching mechanism and one of the plurality of ports, wherein at least a first one of the plurality of port interface controllers is configured to:

receive an outgoing multicast packet from the data link layer switching mechanism, access a first address table, determine, based on information in the first address table, whether a destination of the multicast packet is associated with a host device that has joined a multicast group, transmit, when the host device has joined the multicast group, the multicast packet to the host device via one of the plurality of ports coupled to the host device, determine whether the host device has transmitted data within a period of time, and remove the address associated with the host device from the first address table when the host device has not transmitted data within the period of time, wherein the first address table is configured to store multicast addresses identifying host devices that have joined the multicast group.

20. A device, comprising:

a data link layer switching mechanism;

a plurality of ports; and a plurality of port interface controllers, each of the plurality of port interface controllers coupled to the data link layer switching mechanist and one of the plurality of ports, wherein at least a first one of the plurality of port interface controllers is configured to:
  receive an outgoing multicast packet from the data link layer switching mechanism,
  access a first address table configured to store multicast addresses identifying host devices coupled to one of the plurality of ports,
  determine, based on information in the first address table, whether a destination of the multicast packet is associated with a host device that has joined a multicast group, and
  transmit, when the host device has joined the multicast group, the multicast packet to the host device via one of the plurality of ports coupled to the host device,
wherein each the port interface controllers comprises at first address table, and further comprises a second address table configured to store unicast addresses identifying host devices coupled to one of the plurality of ports.

21. A method, comprising:
determining if a host device has joined a multicast group;
receiving an outgoing multicast packet from a data link layer switching mechanism;
determining, whether a destination of the multicast packet is associated with a host device that has joined the multicast group;
transmitting, when the host device has joined the multicast group, the multicast packet to the host device;
receiving a data packet having a data link layer host address;
comparing the data packet to a target pattern;
identifying a multicast address from the data packet when at least a portion of the data packet matches the target pattern; and
storing the identified multicast address in a data link layer address table.

22. A device, comprising:
a data link layer switching mechanism; and
at least one controller coupled to the data link layer switching mechanism and to an output port, wherein the at least one controller is configured to:
  receive a multicast packet from the data link layer switching mechanism,
  determine whether a destination of the multicast packet is associated with a host device that is included in a multicast group, and
  transmit, when the host device is included in the multicast group, the multicast packet to the host device via an output port coupled to the host device,
  wherein the at least one controller comprises a first address table configured to store multicast addresses identifying host devices that are included in the multicast group and further comprises a second address table configured to store unicast addresses identifying host devices coupled to the device.

23. A device, comprising:
a data link layer switching mechanism; and
at least one controller coupled to the data link layer switching mechanism and to an output port, wherein the at least one controller is configured to:
  receive a multicast packet from the data link layer switching mechanism,
  determine whether a destination of the multicast packet is associated with a host device that is included in a multicast group,
  transmit, when the host device is included in the multicast group, the multicast packet to the host device via an output port coupled to the host device,
  determine whether the host device has transmitted a request to join the multicast group,
  store, when the host device has transmitted a request to join the multicast group, an address associated with the host device in an address table, and
  access the address table to determine whether the host device has joined the multicast group when determining whether a destination of the multicast packet is associated with a host device that is included in a multicast group.

* * * * *